Figure 1:
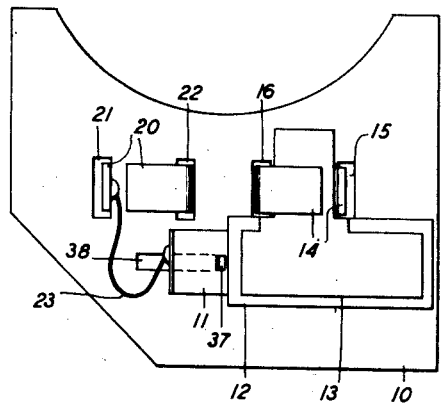

April 2, 1935.   K. F. RODGERS   1,996,123
ELECTRIC CONDENSER
Filed June 21, 1930

INVENTOR
K. F. RODGERS
BY
H. G. Bandfield
ATTORNEY

Patented Apr. 2, 1935

1,996,123

UNITED STATES PATENT OFFICE 1,996,123

ELECTRIC CONDENSER

Karl F. Rodgers, New York, N. Y., assignor to Bell Telephone Laboratories, Incorporated, New York, N. Y., a corporation of New York Application June 21, 1930, Serial No. 462,759

3 Claims. (Cl. 175—41)

This invention relates to condensers and more particularly to condensers adapted to be adjusted to close capacity limits.

There is a considerable demand in the telephone field for condensers which are closely balanced in capacity with respect to each other, these condensers being required particularly for use on composite lines for the simultaneous sending of several telephone and telegraph messages. Also in various other circuits it is required that the condensers used be of a certain definite capacity within very close limits in order to avoid objectionable cross talk and to insure the proper functioning of the circuit as designed.

Heretofore two general procedures have been followed in producing condensers, the capacities of which must be within very close limits. For example, in the case of paper condensers, it is customary to resort to a process of selection, the individual condensers being accurately tested and assigned to different groups, depending upon the measured capacity of the unit. In the case of mica condensers, it is generally customary to bring the capacity of the condenser within allowed variations before potting, either by varying the compactness of the condenser unit or by shifting the relative position of the conductor plates. The process of selection is expensive and the latter procedure is unsatisfactory since it does not provide for changes in capacity due to the potting of the condenser, nor does it provide for errors resulting from temperature corrections as made in commercial manufacturing conditions.

In accordance with the proposed invention, a condenser with its capacity fixed within certain predetermined limits is constructed comprising two associated condensers sealed in a container, one of which has a relatively large capacity, and the other has a relatively small capacity and is capable of adjustment. The condenser of relatively large capacity functions as the main condenser of the system and preferably has a maximum capacity slightly below the predetermined fixed capacity limit of the condenser system. The smaller condenser is so constructed that its capacity, when associated with the large condenser and adjusted, will increase the capacity of the condenser system to the predetermined value. Thus, the small adjustable condenser provides a means of compensating for changes in capacity caused by potting the large condenser in the container. When the condenser of large capacity reaches its equilibrium capacity value after the potting operation, the small condenser is connected thereto, and after the proper capacity adjustment is made it is also sealed in the container. Since the capacity of the small condenser is relatively very small, the change in its capacity due to the potting operation is negligible and the capacity of both condensers remains practically constant.

The resulting device is thus a condenser having a constant fixed capacity within certain close limits and one not subject to capacity change due to handling, humidity effects, etc.

Figure 2:
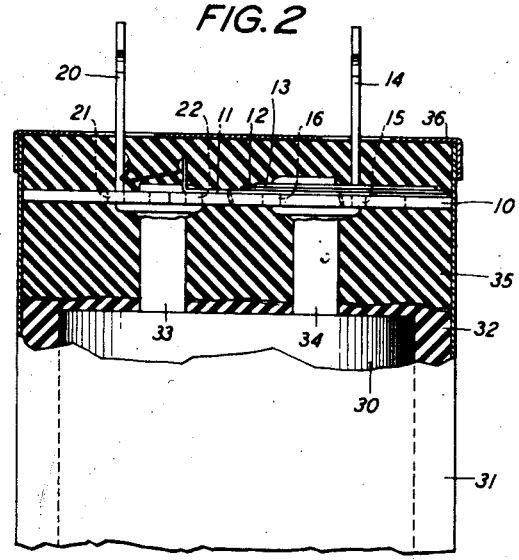

A clearer understanding of this invention may be had by reference to the accompanying drawing in which Fig. 1 is a plan view of the preferred form of adjustable condenser employed in this invention and Fig. 2 is a side elevational view of the condenser unit with a portion of the container removed and partly in cross section.

As shown by Fig. 1 the type of adjustable condenser which is preferably employed consists of a long thin metallic strip 11, for example copper, a T shaped strip of insulating material 12 such as mica and a T shaped metallic strip 13 which also may be of copper mounted on an insulating base 10 and held in place by terminal 14. Terminal 14 which comprises a long thin metallic strip passes through opening 15 in base 10 along the bottom of the base for a short distance, up through opening 16 and is then bent back so as to hold stationary the T shaped mica plate 12 and the T shaped metallic plate 13 thus permitting the metallic plate 11 to be moved backward and forward between the insulated base 10 and the mica strip 12. While this method of securing the plate is preferred due to its simplicity yet it is to be understood that other means may equally well be employed. For example, the T shaped members may be secured to base 10 by rivets, the essential feature being that the plate 11 is easily moved between the insulated base 10 and the mica strip 12. A metallic prong 37 attached to plate 11 fits into groove 38 in base 10 and prevents plate 11 from moving sideways. A terminal 20 similar to 14 passes through opening 21 in base 10, extends along the base for a short distance, then passes up through opening 22 and is bent back along the face of the base 10. A flexible conducting cord 23 connects the movable plate 11 to terminal 20.

In constructing the condenser unit a condenser 30, the capacity of which is within certain predetermined limits, the maximum capacity being at or slightly below the desired capacity of the unit, is sealed in container 31 by a standard potting compound 32 the terminals 33 and 34 of the condenser 30 extending through the compound which only partly fills the container. To compensate for the changes in the capacity of the condenser 30 due to the potting operation, the adjustable condenser is connected in parallel with terminals 33 and 34. This connection may be made, for example, by soldering terminal 33 to that portion of terminal 20 which extends along the bottom of base 10 and by similarly connecting terminal 34 to that portion of terminal 14 which extends along the bottom of base 10. The capacity of the adjustable condenser is then adjusted by moving metallic plate 11 in and out between the insulated base 10 and the mica strip 12 until the desired capacity of the unit has been obtained after which the adjustable condenser is sealed in the container by a similar potting compound 35. A metallic cap 36 through which extends terminals 14 and 20 is then placed over the container to prevent the unit from mechanical injury and from effects of humidity.

What is claimed is:

1. The method of producing a condenser of fixed capacity, the capacity of which is within predetermined limits which consists in sealing a condenser unit of constant capacity in a container connecting a condenser unit of adjustable capacity thereto, adjusting the capacity of said adjustable condenser unit until the capacity of the condenser is within said limits and then sealing said adjustable condenser unit in said container.

2. The method of producing a condenser of fixed capacity, the capacity of which is within predetermined limits, which consists in sealing a condenser unit of constant capacity in a container, connecting a condenser unit of adjustable capacity in parallel with said constant capacity condenser unit adjusting the capacity of said adjustable condenser unit until the capacity of the condenser is within said limits and then sealing said adjustable condenser in said container.

3. The method of producing a condenser of fixed capacity and of desired capacity which consists in sealing in a container a condenser unit, the capacity of which is not greater than the desired capacity of the condenser, connecting a condenser unit of adjustable capacity thereto, adjusting the capacity of said adjustable condenser until the total capacity of the condenser has been obtained and then sealing said adjustable condenser unit in said container.

KARL F. RODGERS.